H. A. VALLEZ.
FILTER PRESS.
APPLICATION FILED MAR. 6, 1915.
1,227,983.
Patented May 29, 1917.
4 SHEETS—SHEET 4.
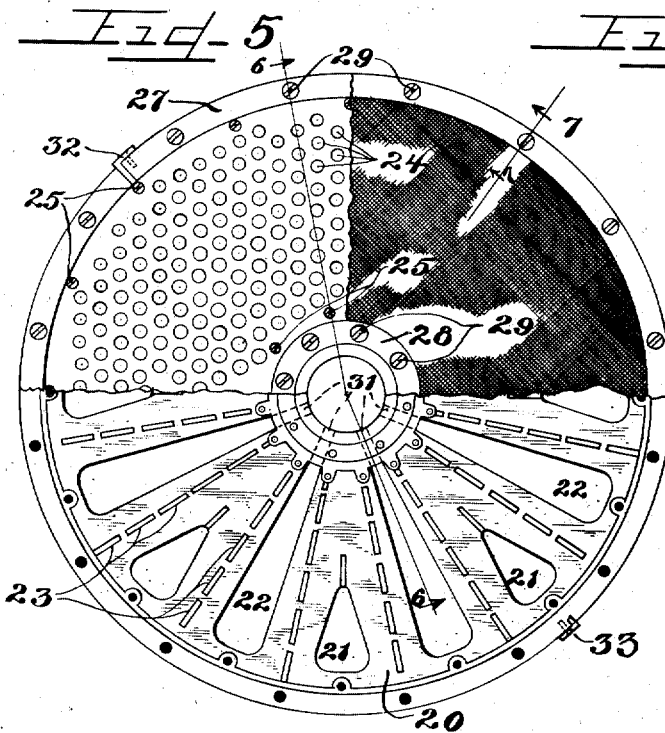
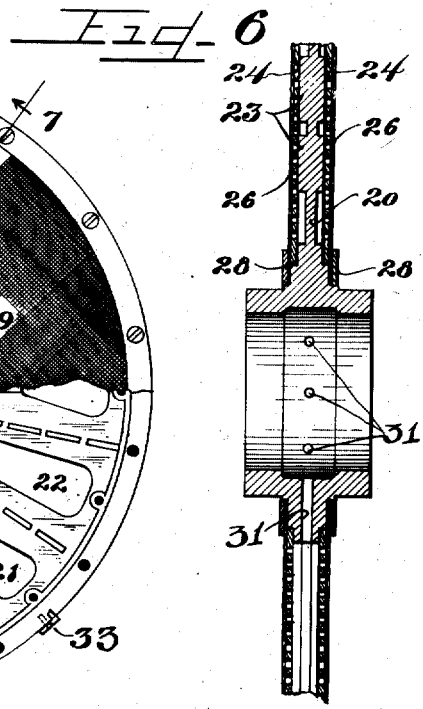
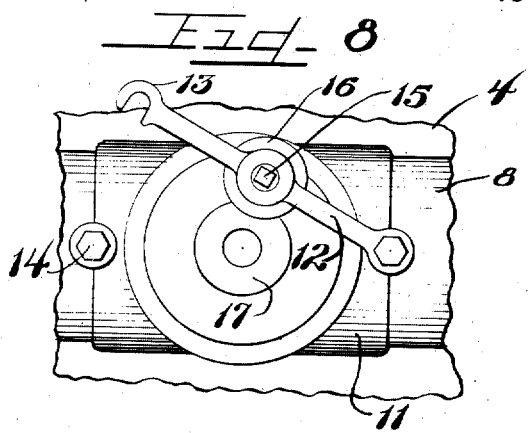
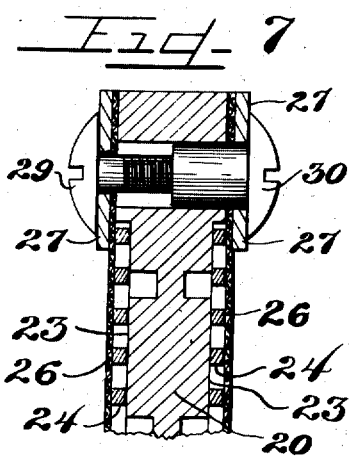
WITNESSES
L. H. Allen
INVENTOR
Henry André Vallez
Atty

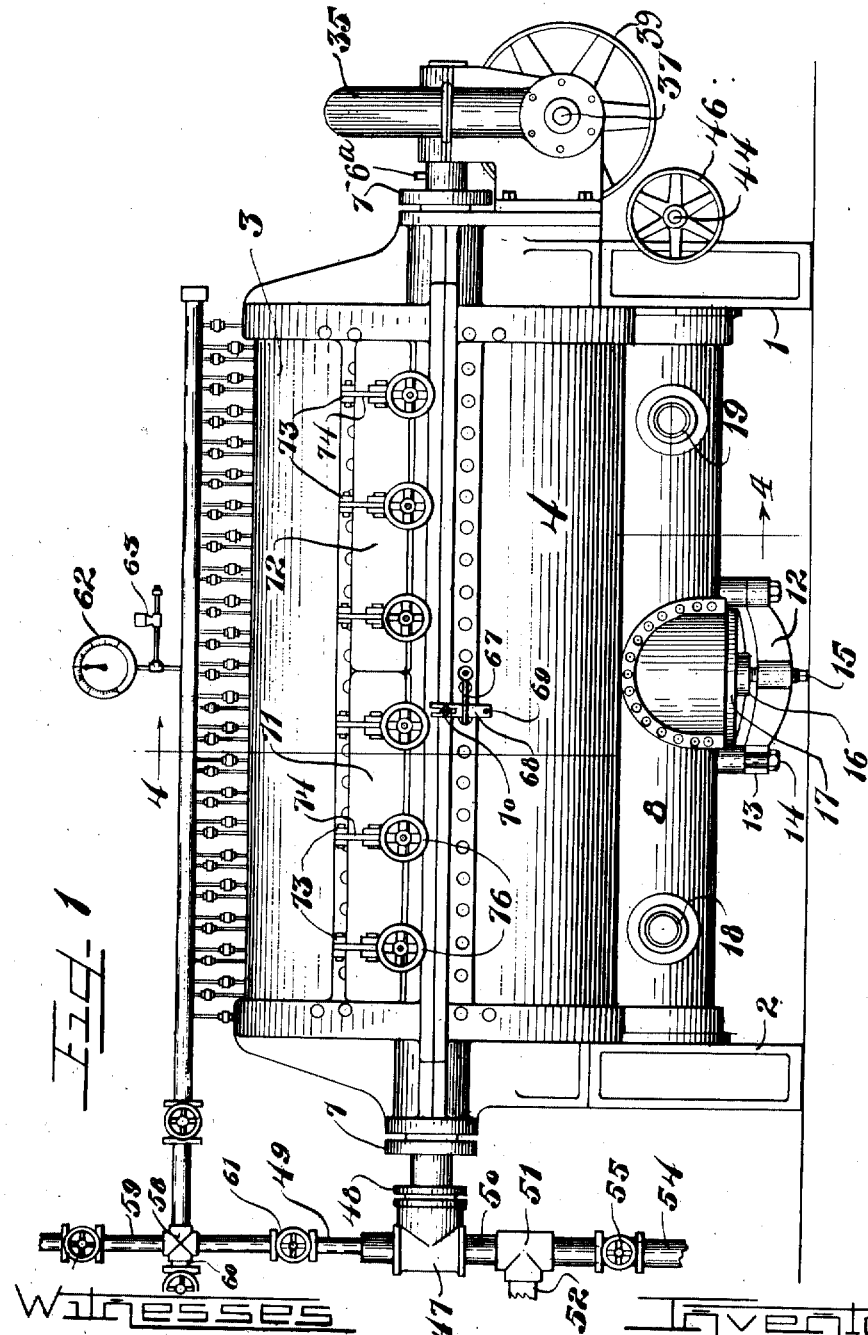

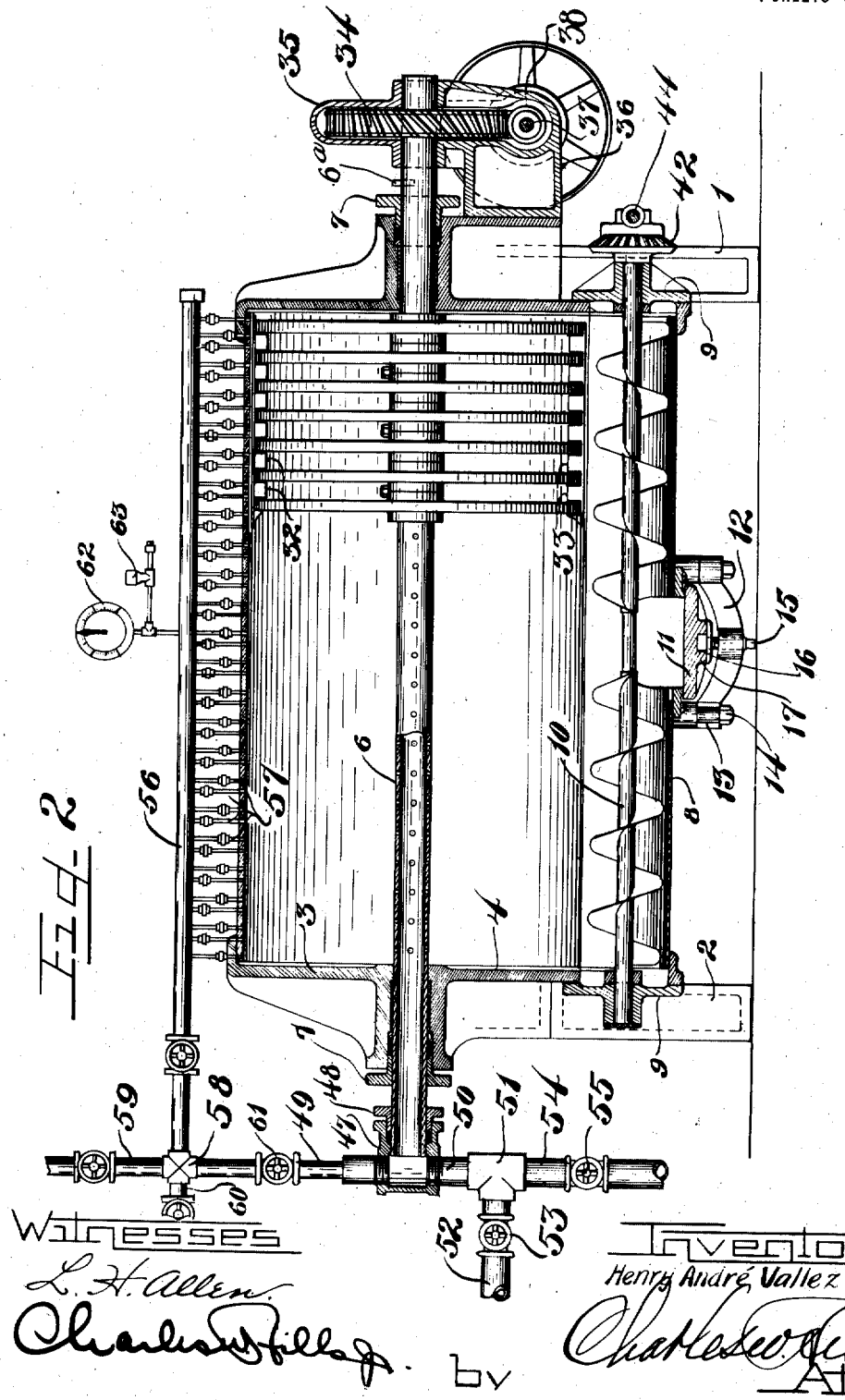

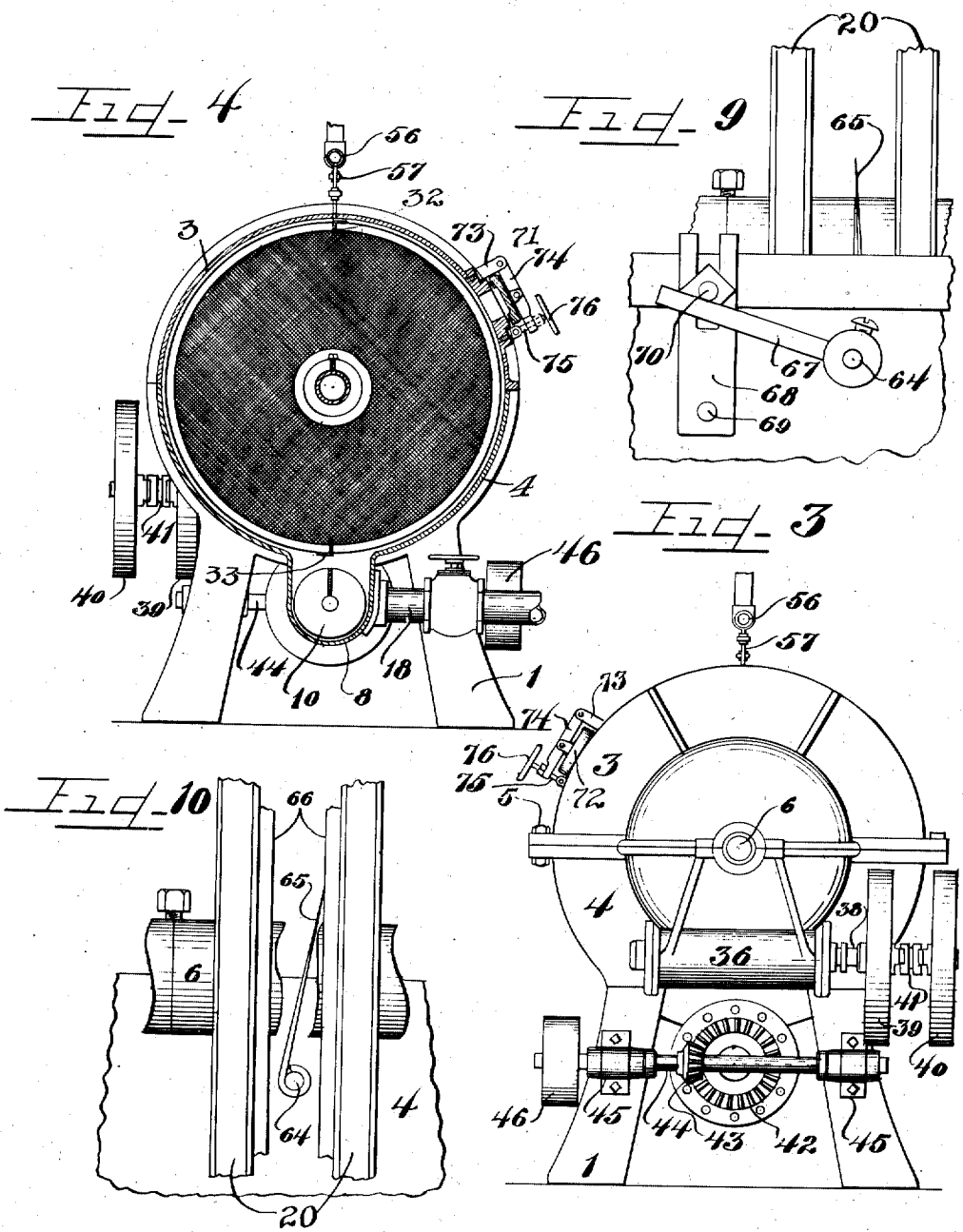

UNITED STATES PATENT OFFICE.

HENRY A. VALLEZ, OF BAY CITY, MICHIGAN.

FILTER-PRESS.

1,227,983.  Specification of Letters Patent.  Patented May 29, 1917.

Application filed March 6, 1915. Serial No. 12,567.

*To all whom it may concern:*

Be it known that I, HENRY A. VALLEZ, a citizen of the United States, and a resident of Bay City, Bay county, Michigan, have invented certain new and useful Improvements in Filter-Presses; and I do hereby declare that the following is a full, clear, and exact description of the same, reference being had to the accompanying drawings, and to the numerals of reference marked thereon, which form a part of this specification.

This invention relates to a machine used for filtering purposes, wherein a cake is allowed to form to a certain extent upon the filtering elements. In this machine, the filtering elements are caused to revolve continuously during a filtering operation to insure the formation of a cake of even depth or thickness upon the various filtering elements, so that the depth of cake upon any one of the filtering elements is a proper indication of the progress of the filtering operation throughout the machine.

It is an object therefore of this invention to construct a filter press provided with rotatable filtering elements and equipped with mechanically operating means which indicates the depth of formation of the cake upon the filtering elements, so that the operation may not be accidentally carried beyond a certain predetermined limit which is determined by the thickness of the cake formed.

It is also an object of this invention to provide a filter press having a plurality of filtering elements, and with means mounted on the upper side of the machine for removing the cake from the filtering elements after a filtering operation, permitting the material removed to gravitate to a discharge conveying mechanism extending along the lower portion of the machine.

It is also an important object of this invention to construct a filter press equipped with indicating means for determination of the thickness of cake on the filtering elements at any time, from the exterior of the machine, and with means for removing the cake from the filtering elements, scraper bars being associated with the filtering elements to assist in clearing the interior of the machine of the cake residue removed, to permit discharge thereof by suitable mechanisms provided for the purpose.

It is furthermore an important object of this invention to construct a filter press provided with rotatable filtering elements mounted upon a hollow shaft through which the filtrate is conducted away, and equipped with indicating means to show the progress of the formation of the cake upon the filtering elements, together with quick opening clamping doors on the casing of the machine giving access to the filtering elements.

It is finally an object of this invention to improve the construction of filter presses, whereby the parts are made more accessible than heretofore, with mechanisms provided permitting the progress of the filtering process to be observed by indicating means mounted on the exterior of the machine.

The invention (in a preferred form) is illustrated in the drawings and hereinafter more fully described.

In the drawings:

Figure 1 is a side elevation of a machine embodying the principles of my invention.

Fig. 2 is a similar view thereof showing the same partly in section and partly in elevation, and with parts omitted.

Fig. 3 is a view of the machine at the driving end thereof.

Fig. 4 is a detail section taken on line 4—4 of Fig. 1, with parts shown in elevation.

Fig. 5 is a detail elevational view of one of the filtering elements shown broken away to illustrate the construction.

Fig. 6 is a fragmentary detail section taken on line 6—6 of Fig. 5.

Fig. 7 is a fragmentary detail section taken on line 7—7 of Fig. 5.

Fig. 8 is a bottom plan view of the quick opening discharge door mounted on the under side of the machine.

Fig. 9 is a fragmentary exterior view of a portion of the machine with the upper casing section removed, illustrating the cake indicating mechanism.

Fig. 10 is a fragmentary interior view of the machine with parts broken away, illustrating the indicating mechanism.

As shown in the drawings:

The machine is mounted upon standards 1 and 2, provided at each end of the machine, and consists of a cylindrical casing comprising upper and lower sections 3 and 4, which are bolted to one another by bolts 5, in a manner to permit the upper section to be removed when so desired. Journaled axially within the cylindrical casing so formed is a hollow shaft 6, which projects outwardly beyond the closed ends of the casing at each end thereof through suitable packing glands 7, which seal around the shaft. Formed on the under side of the lower casing section 4, is a longitudinally extending channel or discharge passage 8, closed at each end by means of cover plates 9, which afford bearings for the shaft of a combination right and left hand helical conveyer 10. At the middle point of said channel 8, a discharge opening is provided, and fitting thereover to close the same, is a cover plate 11. In order to hold said cover plate tightly in sealing relation over said discharge aperture, a heavy curved arm 12, is pivoted at one side thereof and is adapted to extend entirely across beneath said cover plate, a hook 13, being provided on the end of said pivoted arm to engage around a bolt 14, when the arm is swung into locking position. A bolt 15, is threaded through a boss formed at the middle of said bar or arm 12, and has mounted thereon a plate 16, adapted to bear against a circular shoulder 17, formed on the outer surface of the cover plate 11, so that after the arm has been swung into a locked position beneath the cover plate 11, said bolt 15, may be threaded inwardly, thus thrusting said cover plate tightly and sealingly over the aperture in the casing. Mounted on one side of the discharge channel 8, on the exterior thereof are valved inlets 18 and 19, for introducing the solution or mixture to be filtered.

Secured upon said hollow axial shaft 6, within the casing 3—4, are circular filtering elements arranged closely adjacent one another, and each consisting of a metal frame 20, having apertures 21 and 22, extending therethrough affording a plurality of radial arms therebetween. Formed on the opposite surfaces of the radial arms of said frame 20, are rows of projections or ribs 23. Circular perforated plates 24, are secured on each side of the frames 20, by screws 25 and stretched thereover is a cloth or fine screen filtering gauze 26, which is held attached around the outer periphery of the frame by clamping rings 27, and near the center of the filtering element, by clamping rings 28. As clearly shown in Fig. 7, complemental screw bolts 29 and 30, are provided to retain the respective clamping rings 27, on each side of a filter element securely in position, and a similar type of screw bolt is also used to retain the clamping rings 28, in place.

Radially disposed passages 31, are provided through the hubs of the filter frames 20, registering with apertures in the hollow shaft 6, and communicate with the chambers formed by the recesses 22, so that the filtrate which percolates through the filtering elements may flow inwardly through said radial passages into the hollow shaft and be conveyed thereby from the machine. Of course the spaces between the ribs 23, permit the filtrates entering any of the chambers by the recesses 21, to flow into an adjacent chamber 22, and thence through the radial passage into the discharge shaft main 6. When the filtering elements are assembled upon the shaft 6, as clearly shown in Fig. 2, the hubs of each of the filter frames abut one another. Secured to the assembled filter elements on said shaft 6, and extending longitudinally within the casing 3—4, are scraper or cleaning bars 32 and 33, respectively, disposed diametrically opposite one another. A pin 6ª, is mounted in one of the projecting ends of the shaft 6, to designate the position of the scraper bars 32 and 33, within the machine.

For the purpose of rotating the shaft 6, and the filter elements secured thereon, a worm gear 34, is rigidly mounted upon one end of said shaft, and is inclosed within a bearing housing 35, which forms a part of a bearing bracket 36, for a shaft 37, said bracket being bolted upon the head of the drum or casing of the machine. Secured upon said shaft 37, is a worm 38, for driving said worm gear 34, and said shaft 37, may be driven in either direction by oppositely rotating pulleys 39 and 40, which are loose upon said shaft. A sliding clutch member 41, is provided between said pulleys to lock either one thereof to the shaft for rotating the shaft in the direction desired. At the same end of the machine a drive is also provided for the double screw conveyer 10, and for this purpose a bevel gear 42, is secured upon one end of the shaft of said conveyer and is adapted to be driven by a bevel pinion 43, mounted on a shaft 44, journaled in bearings 45, formed or secured upon the frame 1. A driving pulley 46, is secured upon said shaft 44, to drive the same always in the same direction.

The opposite end of the hollow shaft 6, extends into a T 47, in which said shaft is capable of rotation, the T being provided with a packing gland 48, to seal around the shaft. Connected in the branches of said T member 47, are pipes 49 and 50, of which the pipe 50, is connected in another T 51. An outlet pipe 52, provided with a valve 53, is connected in one of the branches of said T 51, and another outlet pipe 54, provided with a valve 55, is connected in the other branch thereof. Extending along and disposed longitudinally above the casing 3—4, is a manifold or supply pipe 56, having a plurality of small spray pipes 57, communicating therewith, each of said pipes being connected through the shell of the upper casing section 3, at points intermediate the filter elements, as clearly shown in Fig. 2, so that two such small pipes are provided between each pair of filter elements. Connected in said supply pipe 56, is a T 58, into which valved supply pipes 59 and 60, are connected, to admit water, steam or air under pressure, as desired, into said manifold pipe 56. Said pipe 49, also communicates therewith and is provided with a valve 61. A pressure gage 62, is connected on said manifold pipe 56, and connected therewith is an automatic release valve 63, to prevent an undue augmentation of pressure taking place within the machine.

For the purpose of indicating the progress of formation of the cake upon the filtering elements, a short shaft 64, is sealingly journaled through the walls of the lower casing section 4, as clearly shown in Figs. 1, 9, and 10. On its inner end said shaft is provided with a long finger 65, which rests against the surface of one of the filtering elements and, as the cake forms therearound, is moved outwardly thereby, thus moving said shaft 64. In Fig. 10, the cake being formed upon the filtering element is denoted by the reference numeral 66, and the finger 65, is shown resting thereagainst. In order to indicate the movement of said finger 65, on the exterior of the machine, an arm 67, is secured on the shaft 64, as clearly shown in Figs. 1 and 9. A plate 68, having a stop pin 69, projecting therefrom, is slotted at one end and adjustably engaged upon a bolt 70, which is secured in the side of the lower casing section 4, so that the arm 67, may swing over said plate between the stop pin 69, and the extended end of the bolt 70.

Mounted on one side of the upper casing section 3, are quick opening hinged doors 71 and 72, each of which extends for half the length of the casing, so that when both of said doors are opened access to all of the filtering elements may be had. Accordingly hinge lugs 73, project outwardly from the wall of said upper casing section 3, and pivotally connected thereon are bars 74, to which the respective doors 71 and 72, are pivotally connected. Pivotally mounted along one side of said doors 71 and 72, respectively, opposite the hinge lugs 73, are bolts 75, each provided with a hand wheel 76, on the outer end thereof, adapted to be threaded downwardly thereon, and the ends of the bar 74, are slotted to permit said bolts 75, to be swung into engagement therewith and receive the hand wheel 76, threaded downwardly thereupon to clamp the door closed in sealing relation upon the casing.

The operation is as follows:

The liquor to be filtered is introduced into the machine through the respective inlet pipes 18 and 19, and the shaft 6, with the filtering element thereon, is caused to rotate. A residue cake, designated by the reference numeral 66, shown in Fig. 10, is formed upon opposite surfaces of each of the filtering elements as the filtration progresses, and the depth of this cake is indicated by the arm 67, on the exterior of the machine, which is caused to move by the finger 65, connected on the same shaft with said arm, and which bears against the surface of the formed cake on the interior of the machine. The possible amplitude of movement of the arm 67, may be changed to any desired amount by adjusting the plate 68, on the bolt 70, so that the distance between the bolt 70, and the stop 69, is a predetermined amount.

When the maximum allowable thickness of cake has been formed upon the filtering element, as shown by the indicating mechanism provided for the purpose, the filtering process is stopped and the inlet pipes 18, and 19, closed. The filtrates during this period have been run out through the hollow pipe 6, which receives the solution from the respective filtering elements, through the outlet pipe 52, the valve 53, being open and the valve 55, in the other outlet pipe closed. The interior of the casing may then be flushed with wash water introduced either through the pipes 18 and 19, or preferably through the small spray pipes 57, the wash water serving to dissolve any of the soluble substance remaining associated with the cake, such as sugar in a sugar filtration process. This wash water is run off through the hollow shaft 6, and out through the outlet pipe 54, the valve 53, being closed, and the valve 55, opened for the purpose. The cake is then removed from the filtering elements by introducing steam, water, or compressed air through the spray pipes 57, and revolving the filtering elements. The cake thus removed falls into the bottom of the casing and into the channel discharge passage 8, and is conveyed therefrom by the rotating helical conveyer 10, the right and left hand blades thereon conveying the material to the central outlet discharge aperture, the plate 11, of course being removed for the purpose.

In the event of any residue remaining within the casing and clinging to the side walls thereof, the filter elements may be rotated, whereupon the scraper bars 32 and 33, attached thereon serve to entirely remove the residue, scraping the same into the discharge channel at the bottom of the machine. The position of the spray pipes 57, is exceedingly advantageous, for the reason that a strong clean flow of wash fluid, steam, or compressed air may be blown directly across the surfaces of the filter elements. As already pointed out, there are two such pipes between each pair of filter elements, permitting a spray of fluid to be blown directly across the surface of each of the elements. The quick opening doors 71 and 72, permit ready access to the interior of the machine for any purpose whatsoever.

I am aware that various details of construction may be varied through a wide range without departing from the principles of this invention, and I therefore do not purpose limiting the patent granted otherwise than necessitated by the prior art.

I claim as my invention:

1. In a device for filtering cake-forming liquids, the combination of a casing, a plurality of filtering elements revolubly mounted therein and spaced apart, a cleaning bar connecting the peripheries of said filtering elements and disposed to travel in close proximity to the interior of said casing, a discharge chamber located beneath said casing and having a discharge opening, a conveyer in said chamber adapted to deliver material to said opening, a plurality of jet-nozzles located near the top of said casing, each nozzle adapted to project a jet of washing liquid against the periphery of a cake at its place of attachment to the face of a filtering element, a pivotally mounted finger in said casing, one end of said finger adapted to engage the surface of the accumulating cake, a cake-thickness indicating device located outside the casing, and means operatively connecting said finger and indicating device, for the purposes set forth.

2. In a device for filtering cake-forming liquids, the combination of a casing, a plurality of filtering elements revolubly mounted therein and spaced apart, means for removing the accumulated cake from said elements, said means comprising a cleaning bar secured to and connecting the peripheries of said filtering elements and disposed to travel in close proximity to the interior of said casing to progressively sweep the casing free of accumulated cake.

3. In a device for filtering cake-forming liquids, the combination of a casing, a plurality of filtering elements revolubly mounted therein and spaced apart, a plurality of cleaning bars secured to and connecting the peripheries of said filtering elements and disposed to revolve with them in close proximity to the interior of said casing, a discharge chamber located beneath said casing and in the path of travel of said bar, said discharge chamber having a discharge opening intermediate its ends, a right- and left-hand conveyer in said chamber adapted to deliver material from said scraping bars to said opening, and means for simultaneously actuating said conveyers.

4. In a device for filtering cake-forming liquids, the combination of a casing, a plurality of filtering elements revolubly mounted therein and spaced apart, a discharge chamber located beneath said casing, a plurality of cleaning bars connecting the peripheries of said filtering elements and disposed to travel in close proximity to the interior of said casing, and a plurality of jet-nozzles located near the top of said casing, each of said nozzles adapted to project a jet of liquid against the periphery of a cake at its place of attachment to the face of one of said filtering elements.

5. In a device for filtering cake-forming liquids, the combination of a casing, a plurality of filtering elements revolubly mounted therein and spaced apart, means for separating the accumulated cake from said elements, said means comprising a plurality of jet nozzles located near the top of said casing, each of said nozzles adapted to project a jet of liquid against the periphery of a cake at its place of attachment to the face of one of said filtering elements, and means for revolving said filtering elements in the path of said jets.

6. In a device for filtering cake-forming liquids, the combination of a casing, a plurality of filtering elements revolubly mounted therein and spaced apart, a pivotally mounted finger within said casing, one end of said finger adapted to engage a surface of an accumulating cake, a thickness-indicating device located outside the casing, and means operatively connecting said finger and indicating device, whereby to indicate the rate of increase in thickness of said cake.

7. In a device for filtering cake-forming liquids, the combination of a casing, a plurality of filtering elements revolubly mounted thereon and spaced apart, a pivotally mounted finger within said casing, one end of said finger adapted to yieldingly bear against a surface of an accumulating cake, a shaft for said finger, said shaft projecting outside said casing, and an arm carried by the outer end of said shaft and adapted to indicate the rate of increase in thickness of said cake.

In testimony whereof I have hereunto subscribed my name in the presence of two subscribing witnesses.

HENRY A. VALLEZ.

Witnesses:
CHARLES W. HILLS, Jr.,
FRANK K. HUDSON.